US012678882B2

(12) United States Patent
Park et al.

(10) Patent No.: US 12,678,882 B2
(45) Date of Patent: Jul. 14, 2026

(54) SUBSTRATE PROCESSING APPARATUS

(71) Applicant: Samsung Electronics Co., Ltd.,
Suwon-si (KR)

(72) Inventors: Jung Sik Park, Suwon-si (KR); Jong Chul Kim, Suwon-si (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 13 days.

(21) Appl. No.: 18/640,164

(22) Filed: Apr. 19, 2024

(65) Prior Publication Data

US 2025/0144730 A1     May 8, 2025

(30) Foreign Application Priority Data

Nov. 7, 2023     (KR) ........................ 10-2023-0152327

(51) Int. Cl.
B23K 3/08        (2006.01)
B23K 1/00        (2006.01)
B23K 1/20        (2006.01)

(52) U.S. Cl.
CPC ............ B23K 3/085 (2013.01); B23K 1/0016 (2013.01); B23K 1/203 (2013.01)

(58) Field of Classification Search
None
See application file for complete search history.

(56) References Cited

U.S. PATENT DOCUMENTS

| | | | | |
|---|---|---|---|---|
| 5,347,103 | A * | 9/1994 | LeMieux | H05K 13/0465 |
| | | | | 219/400 |
| 5,440,101 | A * | 8/1995 | Cox | H05K 13/02 |
| | | | | 34/212 |
| 6,780,225 | B2 * | 8/2004 | Shaw | B23K 1/012 |
| | | | | 228/43 |
| 7,914,595 | B2 * | 3/2011 | Nakamura | B01D 45/16 |
| | | | | 55/482 |
| 7,973,266 | B2 * | 7/2011 | Nakajima | H01L 21/67115 |
| | | | | 118/729 |
| 8,110,015 | B2 * | 2/2012 | Neiderman | B23K 1/018 |
| | | | | 95/288 |
| 9,156,101 | B2 | 10/2015 | Kuroda et al. | |
| 9,511,379 | B2 * | 12/2016 | Hiyama | B23K 1/0016 |
| 9,751,146 | B2 * | 9/2017 | Kagaya | B23K 1/0016 |
| 10,537,031 | B2 | 1/2020 | Hillman et al. | |

(Continued)

FOREIGN PATENT DOCUMENTS

| | | | | |
|---|---|---|---|---|
| CN | 205551722 | U | * | 9/2016 |
| CN | 114029578 | A | | 2/2022 |

(Continued)

*Primary Examiner* — Devang R Patel
(74) *Attorney, Agent, or Firm* — Harness, Dickey & Pierce, P.L.C.

(57)     ABSTRACT

A substrate processing apparatus that reduces and/or minimizes contamination of mounting boards. The substrate processing apparatus includes a frame with an opening formed at its bottom and including an internal space; a first plate below the frame; and a second plate below the first plate. The first plate includes a plurality of first holes. The second plate includes a plurality of second holes, and at least one second dam which surrounds at least one of the second holes and protrudes toward the internal space. The first holes are staggered with respect to the second holes in a vertical direction.

18 Claims, 11 Drawing Sheets

(56) References Cited

U.S. PATENT DOCUMENTS

| | | | |
|---|---|---|---|
| 11,148,217 B2 | 10/2021 | Yamaguchi et al. | |
| 2018/0073131 A1 * | 3/2018 | Lee .................. | H01J 37/32724 |
| 2023/0141430 A1 | 5/2023 | Endreß et al. | |
| 2023/0219157 A1 | 7/2023 | Wang | |

FOREIGN PATENT DOCUMENTS

| | | | |
|---|---|---|---|
| KR | 2003-0037384 A | 5/2003 | |
| WO | WO-2011135737 A1 * | 11/2011 | ........... B23K 1/0016 |

* cited by examiner

SUBSTRATE PROCESSING APPARATUS

CROSS-REFERENCE TO RELATED APPLICATION

This application claims priority from Korean Patent Application No. 10-2023-0152327 filed on Nov. 7, 2023 in the Korean Intellectual Property Office, and all the benefits accruing therefrom under 35 U.S.C. 119, the contents of which in its entirety are herein incorporated by reference.

BACKGROUND

The present disclosure relates to substrate processing apparatuses.

As electronic devices are rapidly becoming smaller and thinner, there is a demand for miniaturization and thinning of electronic components such as semiconductor devices that are mounted on these electronic devices. As electronic components become more densely packed, the number of connection terminals increases.

Solder balls can be used as connection terminals for a mounting board such as printed circuit boards (PCBs). Flux is applied to the pads of the mounting board, and solder balls are mounted on top. In subsequent processes, the flux can become fumes and contaminate the mounting board. As the number of connection terminals increases, the usage of flux also increases, which means more fumes can be produced by the flux.

SUMMARY

Example embodiments of inventive concepts provide a substrate processing apparatus that reduces (and/or minimizes) the contamination of mounting boards.

However, example embodiments of inventive concepts are not restricted to those set forth herein. The above and other example embodiments of the inventive concepts will become more apparent to one of ordinary skill in the art to which the inventive concepts pertains by referencing the detailed description of inventive concepts given below.

Example embodiments of inventive concepts provide a substrate processing apparatus that includes a frame with an opening at a bottom of the frame, the frame including an internal space; a first plate below the frame; and a second plate below the first plate. The first plate includes a plurality of first holes. The second plate includes a plurality of second holes, and at least one second dam surrounding at least one of the plurality of second holes and protruding toward the internal space. The plurality of first holes are staggered with respect to the plurality of second holes in a vertical direction.

Example embodiments of inventive concepts further provide a substrate processing apparatus that includes a transport unit that transports substrates in one direction; a plurality of heating zones sequentially on the transport unit along the one direction; and at least one cooling zone on the transport unit along the one direction, the at least one cooling zone downstream of the plurality of heating zones. The at least one cooling zone includes a frame, a first plate below the frame, and a second plate below the first plate. The frame includes an internal space and an opening at a bottom of the frame. The first plate includes a plurality of first holes and at least one first dam, the at least one first dam surrounding at least one of the plurality of first holes and protruding toward the internal space. The second plate includes a plurality of second holes and at least one second dam, the at least one second dam surrounding at least one of the plurality of second holes and protruding toward the internal space. The plurality of first holes are staggered with respect to the plurality of second holes in a vertical direction.

Example embodiments of inventive concepts still further provide a substrate processing apparatus that includes a frame with an opening at a bottom of the frame, the frame including an internal space; a first plate below the frame; and a second plate below the first plate. The first plate includes a plurality of first holes, and a plurality of first dams surrounding the plurality of first holes and protruding toward the internal space. The second plate includes a plurality of second holes, and a plurality of second dams surrounding the plurality of second holes and protruding toward the internal space. The plurality of first holes are staggered with respect to the plurality of second holes in a vertical direction. The second plate has a first region, a second region outside the first region. A first distance from the first region to the first plate is less than a second distance from the second region to the first plate. The second plate further includes trenches that collect liquefied fumes. The substrate processing apparatus further includes a suction unit that removes the liquefied fumes collected in the trenches.

It should be noted that the effects of inventive concepts are not limited to those described above, and other effects of inventive concepts will be apparent from the following description.

BRIEF DESCRIPTION OF THE DRAWINGS

The above and other example embodiments and features of the inventive concepts will become more apparent in view of the following detailed description of example embodiments thereof with reference to the attached drawings, in which.

DETAILED DESCRIPTION

Figure 1:
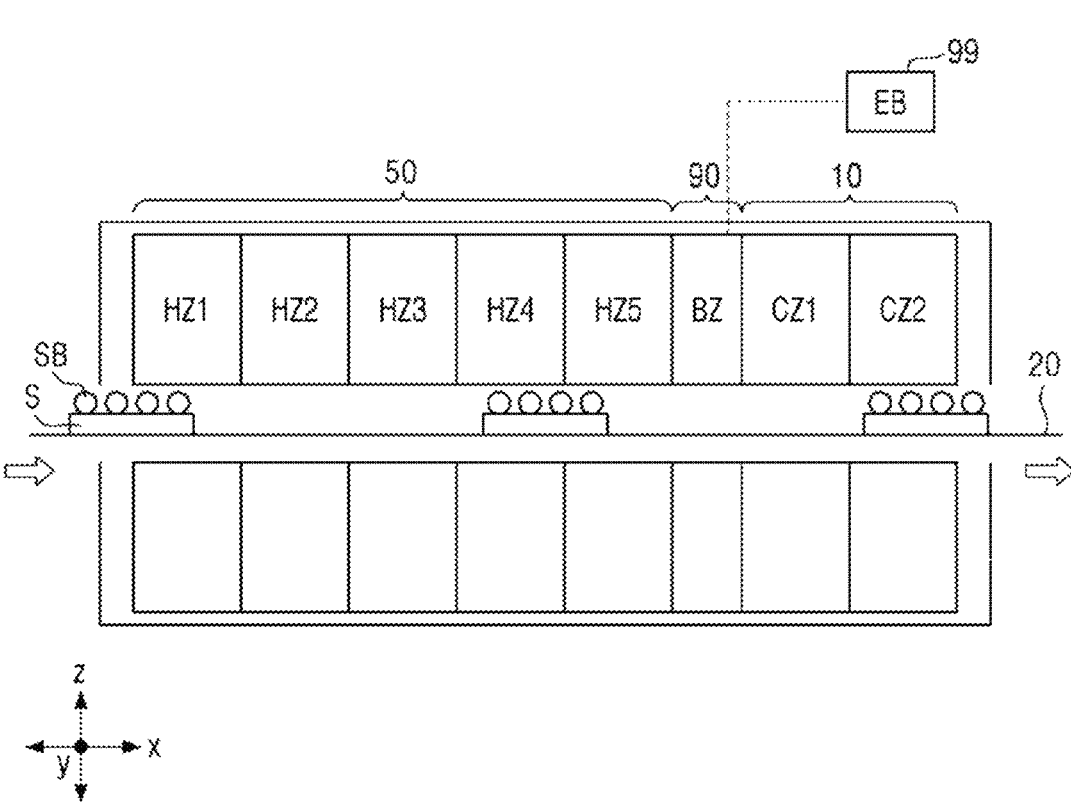
FIG. 1 is a conceptual diagram illustrating a substrate processing apparatus according to some example embodiments of the inventive concepts.

Embodiments of inventive concepts will hereinafter be described with reference to the accompanying drawings. The same reference numerals are used for the same components in the drawings, and redundant descriptions thereof are omitted.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Also, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

FIG. 1 is a conceptual diagram illustrating a substrate processing apparatus according to some example embodiments of inventive concepts.

Referring to FIG. 1, the substrate processing apparatus may be, for example, a reflow device.

Substrates S entering the reflow device may be substrates with solder balls SB mounted thereon. For example, the solder balls SB may be attached to one surface of each of the substrates S. For example, a plurality of pads are disposed on one surface of each of the substrate S, flux is applied to each of the pads, and the solder balls SB are mounted on the flux. The flux is a solvent for effectively adhering the pads and the solder balls SB. When the substrates S with the solder balls SB mounted thereon pass through the reflow device, the solder balls SB melt due to heat and adhere to the pads of each of the substrates S.

The substrate processing apparatus includes a transport unit 20, a heating module 50, a cooling module 10, and a buffer module 90. A controller (not illustrated) controls the operations of the transport unit 20, the heating module 50, the cooling module 10, and the buffer module 90.

The transport unit 20 moves the substrates S in one direction (for example, in an x-axis direction). The transport unit 20 may include, for example, a conveyor device (e.g., a belt conveyor, a roller conveyor, a wheel conveyor, etc.) and a belt device (e.g., a flat belt, a transport chain belt, etc.), but inventive concepts are not limited thereto. A plurality of substrates S may be arranged side by side in a y-axis direction on the transport unit 20 and may be moved simultaneously in the x-axis direction, but inventive concepts are not limited thereto.

The heating module 50 includes a plurality of heating zones HZ1, HZ2, HZ3, HZA, and HZ5, which are for heating the substrates S. For example, the temperature in each of the heating zones HZ1, HZ2, HZ3, HZ4, and HZ5 may be above 200° C. (e.g., 230° C.). A heater may be provided within, for example, the heating zone HZ1. The heater heats the gas within the heating zone HZ1, e.g., generates a heating gas, and the heating gas is supplied to the substrates S to heat the substrates S. The heater may be a line through which a high-temperature fluid flows or a resistor heated by electricity, but inventive concepts are not limited thereto.

The cooling module 10 includes one or more cooling zones CZ1 and CZ2, which are for cooling the substrates S. For example, the temperature in each of the cooling zones CZ1 and CZ2 may be below 100° C. (e.g., between 60° C. and 70° C.). A cooler may be provided within, for example, the cooling zone CZ1. The cooler cools the gas within the cooling zone CZ1, e.g., generates a cooling gas, and the cooling gas is supplied to the substrates S to cool the substrates S. The cooler may be, for example, a refrigerant line through which a refrigerant flows, but inventive concepts are not limited thereto.

The temperature of the cooling zone CZ1 and the temperature of the cooling zone CZ2 may be controlled to be different. To achieve this, the number of holes in the cooling zone CZ1 for supplying gas and the number of holes in the cooling zone CZ2 may be adjusted to be different. For example, the number of holes in the cooling zone CZ1 may be less than the number of holes in the cooling zone CZ2.

An example configuration of the cooling zone CZ1 will be described later with reference to FIGS. 2 through 16.

The buffer module 90 is disposed between the heating module 50 and the cooling module 10. The buffer module 90 includes a buffer zone BZ. The buffer zone BZ neither heats nor cools the substrates S. Due to the presence of the buffer zone BZ, the influence of the heating module 50 and the cooling module 10 on each other can be reduced (and/or minimized).

The buffer zone BZ may be connected to an exhaust box 99. The heating gas in the heating zones HZ1, HZ2, HZ3, HZA, and HZ5 or the cooling gas in the cooling zones CZ1 and CZ2 is transferred to the exhaust box 99 through the buffer zone BZ and discharged.

The operation of the substrate processing apparatus will hereinafter be described.

As the substrates S with the solder balls SB mounted thereon pass through the heating module 50, heat is applied to the substrates S. Before reaching the melting point of the solder, the flux is first activated, removing oxides and impurities present on the surfaces of the solder balls SB. When the melting point of the solder is reached, the solder balls SB melt and adhere to the pads. The solder balls SB do not flow off completely but are formed into a spherical shape due to surface tension.

Thereafter, as the substrates S pass through the cooling module 10, the substrates S begin to cool. The solder balls SB solidify back while maintaining their spherical shape.

At least some of the flux in the heating module 50 vaporizes. That is, fumes from the flux are generated. The fumes from the flux may be mixed with the heating gas and diffused.

Particularly, due to the temperature difference between the heating zones HZ1, HZ2, HZ3, HZA, and HZ5 and the cooling zones CZ1 and CZ2, the fumes in a vaporized state between the buffer zone BZ and the cooling zone CZ1, and/or within the cooling zones CZ1 and CZ2, liquefy. The liquefied fumes may fall on the substrates S being processed, potentially contaminating them.

A substrate processing apparatus that can reduce (and/or minimize) contamination of the substrates S during a reflow process will hereinafter be described.

Figure 2:
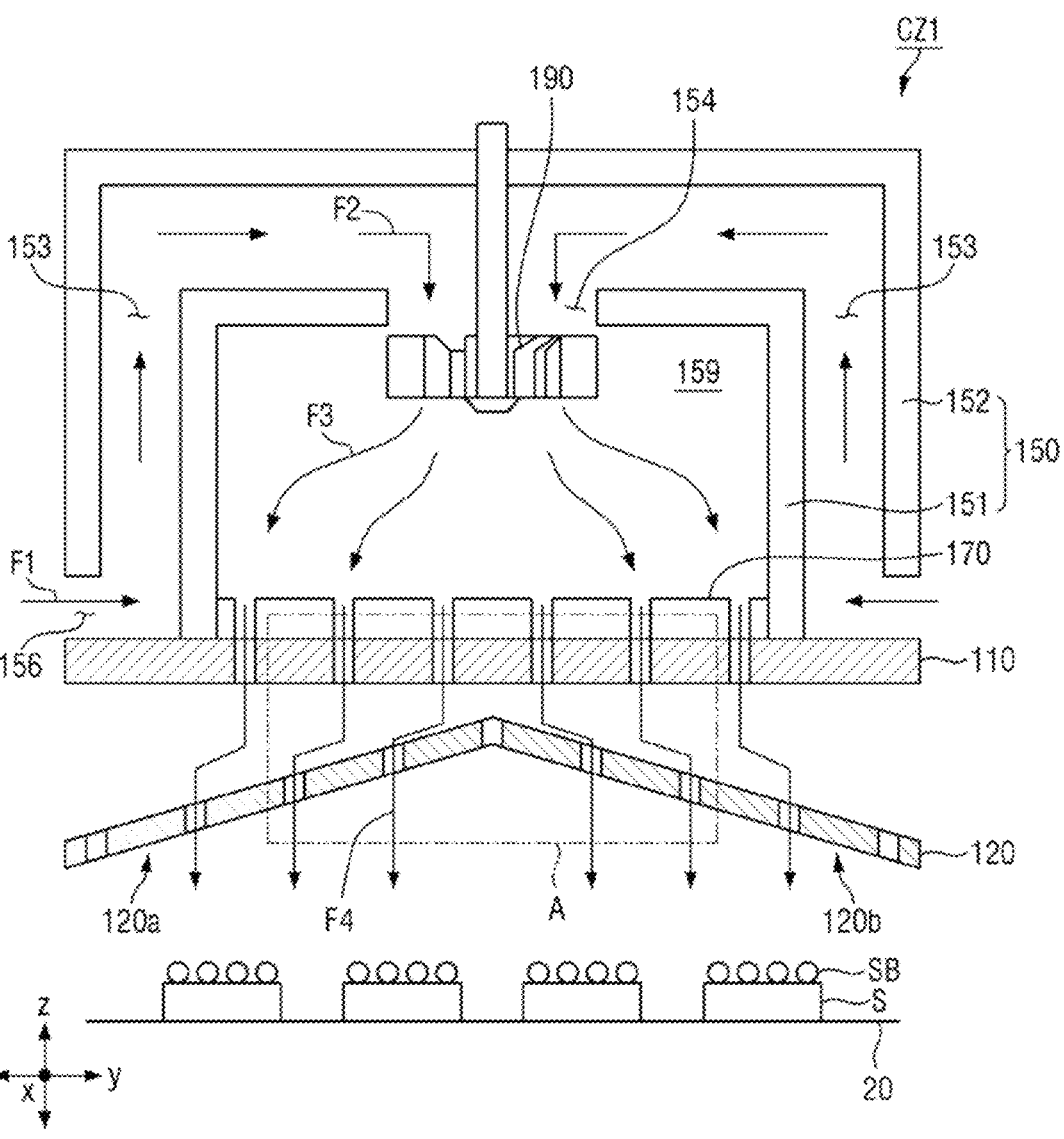
FIG. 2 is a cross-sectional view illustrating a cooling zone CZ1 of FIG. 1.

FIG. 2 is a cross-sectional view illustrating the cooling zone CZ1 of FIG. 1. FIG. 2 illustrates only the cooling zone CZ1, but other cooling zones such as the cooling zone CZ2 may also have substantially the same configuration as the cooling zone CZ1.

Referring to FIG. 2, the cooling zone CZ1 includes a frame 150, a first plate 110, a second plate 120, and an impeller 190.

The frame 150 has an opening at its bottom and includes an internal space 159. The shaft of the impeller 190 penetrates the top surface of the frame 150, and the blades of the impeller 190 are positioned within the internal space 159.

For example, the frame 150 includes first and second frames 151 and 152.

The first frame 151 includes an opening, which is installed at the bottom of the first frame 151, and an air flow passage 154, which is installed at the top of the first frame 151.

The second frame 152 may be formed above the first frame 151 to surround the sidewalls and the top surface of the first frame 151. That is, an opening is installed at the bottom of the second frame 152. Additionally, air inlets 156 may be formed on the sidewalls of the second frame 152, but inventive concepts are not limited thereto.

The first plate 110 is disposed below the frame 150. The second plate 120 is disposed below the first plate 110.

A cooler 170 for cooling gas (for example, air) may be disposed above the first plate 110. Therefore, the gas entering through the air inlets 156 may be cooled within the internal space 159 or may be cooled, passing through the first plate 110.

The operation of the substrate processing apparatus in the cooling zone CZ1 will hereinafter be described.

Gas is introduced through the air inlets 156, as indicated by arrows F1, and by the operation of the impeller 190, the introduced gas moves along a space 153 between the first and second frames 151 and 152 to the air flow passage 154, as indicated by arrows F2. Then, the gas passing through the air flow passage 154 moves downward and diffuses in the internal space 159, as indicated by arrows F3. After passing through the first and second plates 110 and 120, the gas is supplied to the substrates S with the solder balls SB mounted thereon, which are moved by the transport unit 20, as indicated by arrows F4.

Figure 3:
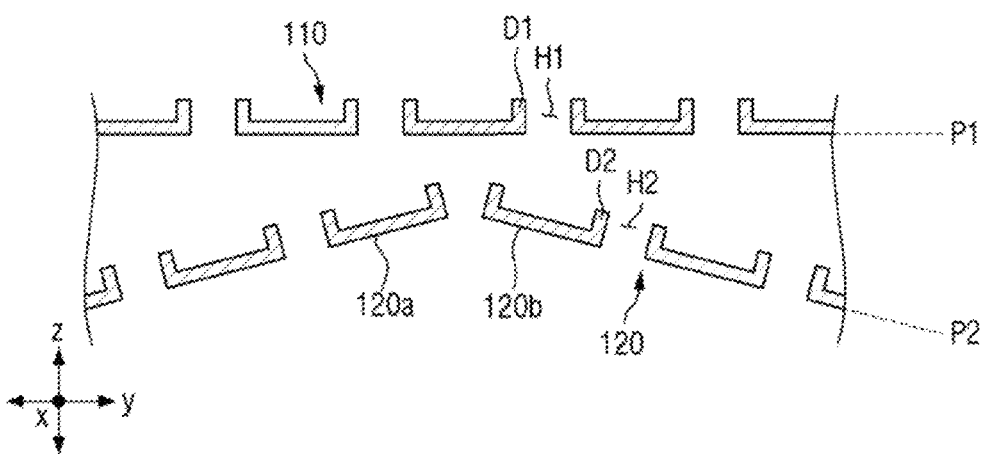
FIG. 3 is an enlarged cross-sectional view of area A of FIG. 2 for explaining first and second plates.
Figure 4:
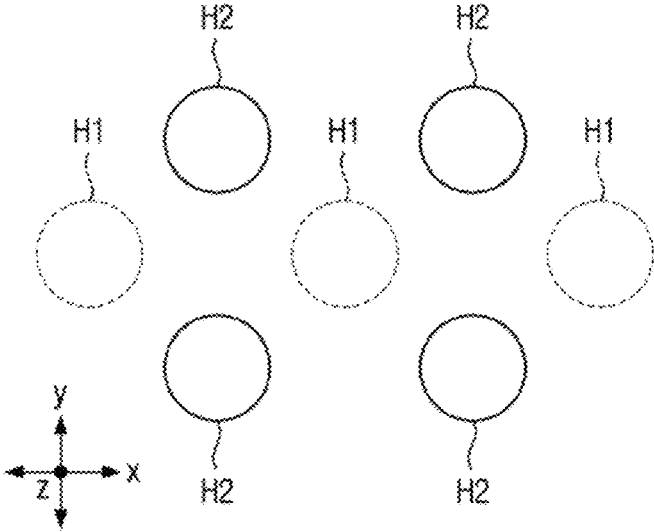
FIG. 4 is a schematic drawing for explaining the relationship between first holes of the first plate and second holes of the second plate.
Figure 5:
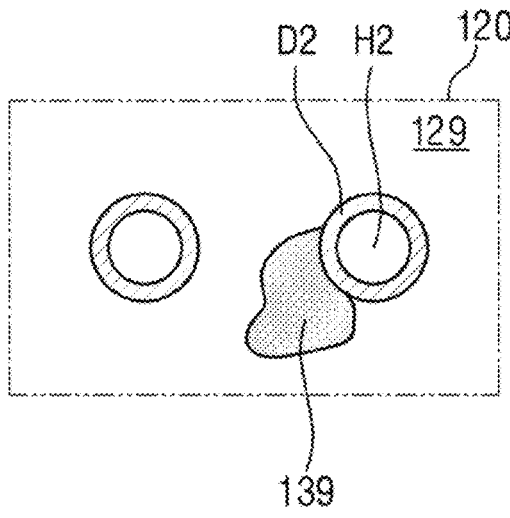
FIG. 5 is a schematic drawing for explaining the effect of the second plate in limiting and/or preventing fumes.
Figure 6:
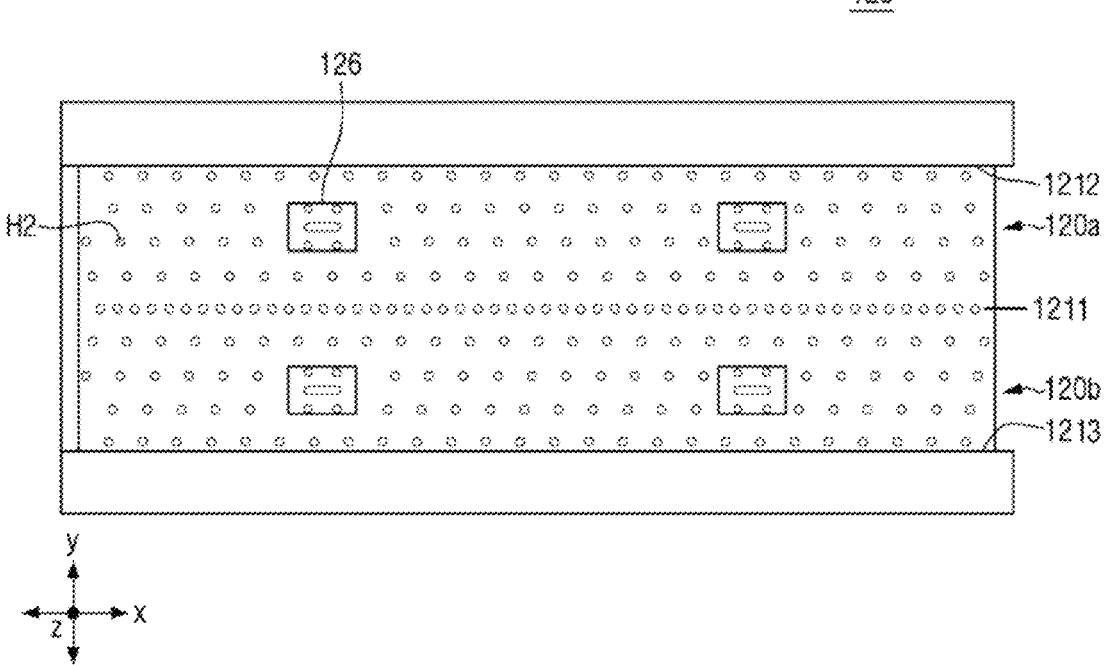
FIG. 6 is a bottom view of the second plate.
Figure 7:
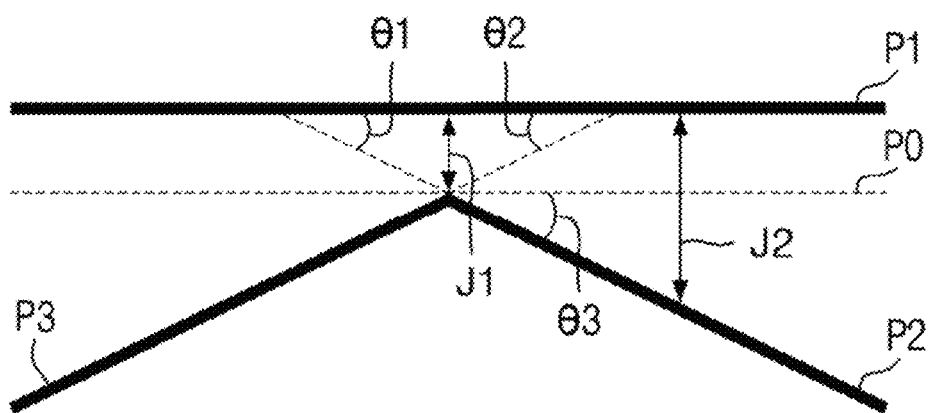
FIG. 7 is a conceptual diagram for explaining the structure of the second plate.

FIG. 3 is an enlarged cross-sectional view illustrating area A of FIG. 2 for explaining the first and second plates. FIG. 4 is a schematic drawing for explaining the relationship between first holes of the first plate and second holes of the second plate. FIG. 5 is a schematic drawing for explaining the effect of the second plate in limiting and/or preventing fumes. FIG. 6 is a bottom view of the second plate. FIG. 7 is a conceptual diagram for explaining the structure of the second plate.

Referring to FIGS. 3 and 4, the first plate 110 includes a plurality of first holes H1, and the second plate 120 includes a plurality of second holes H2.

The first holes H1 of the first plate 110 and the second holes H2 of the second plate 120 are staggered in a vertical direction (e.g., a z-axis direction). For example, when viewed in the z-axis direction, the overlapping area between the first holes H1 and the second holes H2 is reduced (and/or minimized). For example, the overlapping area between the first holes H1 and the second holes H2 may be less than 10%, preferably less than 5%, more preferably less than 3%, or most preferably 0%.

Additionally, the first plate 110 may further include a plurality of first dams D1, and the second plate 120 may further include a plurality of second dams D2.

The first dams D1 may be formed to surround the corresponding first holes H1 and protrude toward the internal space 159. The first dams D1 and the first holes H1 may correspond one-to-one to one another, but inventive concepts are not limited thereto.

The second dams D2 may be formed to surround the corresponding second holes H2 and protrude toward the internal space 159. The second dams D2 and the second holes H2 may correspond one-to-one to one another, but inventive concepts are not limited thereto.

As previously described, due to the temperature difference between the heating zones HZ1, HZ2, HZ3, HZA, and HZ5 of FIG. 1 and the cooling zones CZ1 and CZ2 of FIG. 1, fumes in a vaporized state liquefy. That is, liquefied fumes may occur in the internal space 159 or in the space 153 between the first and second frames 151 and 152. Since the first holes H1 and the second holes H2 are staggered, and the first dams D1 and the second dams D2 are installed around the first holes H1 and the second holes H2, respectively, it is difficult for the liquefied fumes to fall onto and contaminate the substrates S.

For example, because of the presence of the first dams D1 around the first holes H1, it is difficult for the liquefied fumes to cross over the first dams D1 and fall into the first holes H1.

Furthermore, even if the liquefied fumes pass through the first holes H1 of the first plate 110, the liquefied fumes fall onto the bottom surface of the second plate 120 (e.g., the surface of the second plate 120 facing the first plate 110) because the first holes H1 do not overlap with the second holes H2. As illustrated in FIG. 5, liquefied fumes 139 remain on the bottom surface 129 and cannot enter the second holes H2 over the second dams D2.

Referring back to FIGS. 3 and 6, the second plate 120 may include a first sub-plate 120a and a second sub-plate 120b.

The first sub-plate 120a may extend longitudinally in the x-axis direction, and the second sub-plate 120b may also extend longitudinally in the x-axis direction.

The first sub-plate 120a includes a first edge 1211 and a second edge 1212, which is positioned opposite to the first edge 1211. The second sub-plate 120b includes a first edge 1211 and a third edge 1213, which is positioned opposite to the first edge 1211. The first edge 1211 of the first sub-plate 120a and the first edge 1211 of the second sub-plate 120b may be connected to each other.

In the second plate 120, the position of the first edge 1211 may be higher than the second and third edges 1212 and 1213 in the z-axis direction. That is, the second edge 1212 of the first sub-plate 120a tilts downward compared to the first edge 1211, and the third edge 1213 of the second sub-plate 120b tilts downward compared to the first edge 1211. Therefore, the liquefied fumes 139 that fall onto bottom surface 129 of the second plate 120 may flow down along the inclined surfaces of the second plate 120.

Referring to FIG. 6, a plurality of connectors 126 are formed. Through connecting lines (e.g., metal lines) that are fixed to the connectors 126, the first and second plates 110 and 120 may be fixed together.

The shape of the second sub-plate 120b will hereinafter be described in further detail.

Referring to FIGS. 3 and 7, a first imaginary plane P1 may be defined along the extension direction of the first plate 110, and a second imaginary plane P2 or a third imaginary plane P3 may be defined along the extension direction of the second plate 120.

The first and second imaginary planes P1 and P2 intersect at an acute angle θ1. Also, the first and third imaginary planes P1 and P3 intersect at an acute angle θ2.

The first imaginary plane P1 intersects a horizontal plane P0 at a first angle, and the second imaginary plane P2 intersects the horizontal plane P0 at a second angle, which may be greater than the first angle. As illustrated, the first imaginary plane P1 may be parallel to the horizontal plane P0, making the angle between the first imaginary plane P1 and the horizontal plane P0 equal to 0. The second imaginary plane P2 may form an angle θ3 with the horizontal plane P0. The angle θ3 is greater than 0.

For example, the second plate 120 may include a first region (or a central region), and a second region (or an edge region) which is positioned outside the first region. Here, a first distance J1 from the first region to the first plate 110 is less than a second distance J2 from the second region to the first plate 110.

The height of second dams D2 formed in the first region (or central region) may be greater than the height of second dams D2 formed in the second region (or edge region). Incidentally, more liquefied fumes may fall onto the first region than onto the second region. Therefore, to reduce the likelihood of liquefied fumes falling onto the substrates S, the height of the second dams D2 formed in the first region may be sufficiently increased.

Additionally, the temperature of the cooling zone CZ1 and the temperature of the cooling zone CZ2 may be controlled to be different. For this purpose, the number of holes in the cooling zone CZ1 for supplying gas and the number of holes in the cooling zone CZ2 for supplying gas may be adjusted to be different. For example, the number of second holes H2 in the cooling zone CZ1 may be less than the number of second holes H2 in the cooling zone CZ2.

Figure 8:
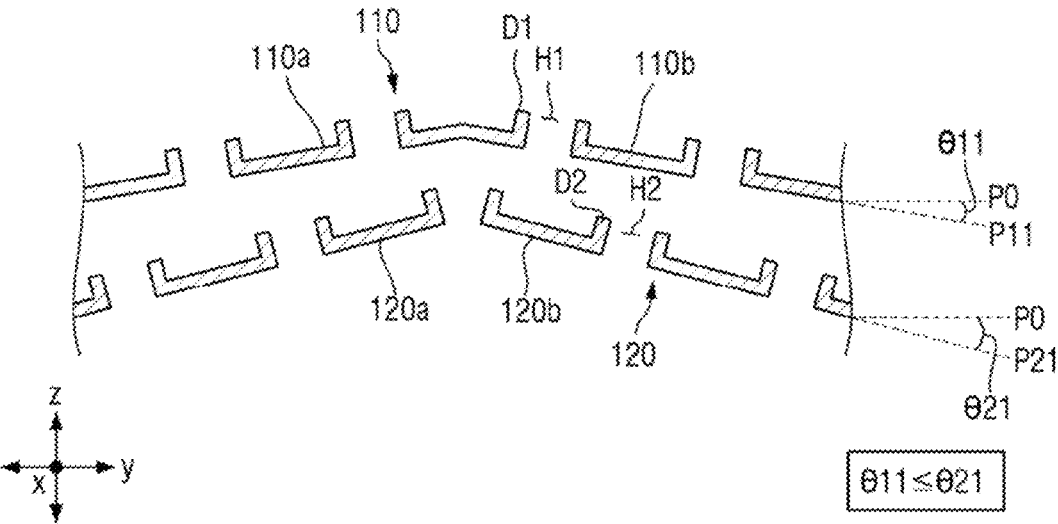
FIG. 8 is a schematic drawing illustrating a substrate processing apparatus according to some example embodiments of the inventive concepts.

FIG. 8 is a schematic drawing illustrating a substrate processing apparatus according to some example embodiments of the inventive concepts. For convenience, the embodiment of FIG. 8 will hereinafter be described, focusing mainly on the differences with the embodiment of FIGS. 3 through 7.

Referring again to FIGS. 3 and 7, the imaginary plane P1, extended along the first plate 110, is parallel to the horizontal plane P0, and the imaginary plane P2, extended along the second plate 120, is inclined downward relative to the horizontal plane P0.

Alternatively, referring to FIG. 8, the imaginary plane P11, extended along the first plate 110, and the imaginary plane P21, extended along the second plate 120, may both be inclined downward.

For example, the first plate 110 includes two sub-plates 110*a* and 110*b*, and the sub-plates 110*a* and 110*b* may be connected together at one edge. The second plate 120 includes two sub-plates 120*a* and 120*b*, and the sub-plates 120*a* and 120*b* may also be connected together at one edge.

The imaginary plane P11, extended along the first plate 110, forms an angle θ11 with the horizontal plane P0. The imaginary plane P21, extended along the second plate 120, forms an angle θ21 with the horizontal plane P0. Here, if the angles θ11 and θ21 are greater than 0, the angle θ21 is equal to or greater than the angle θ11.

In the embodiment of FIG. 8, liquefied fumes that fall onto the bottom surface of the first plate 110 may flow downward along the inclined surfaces of the first plate 110. Similarly, liquefied fumes that fall onto the bottom surface of the second plate 120 after passing through the first plate 110 may also flow downward along the inclined surfaces of the second plate 120.

Additionally, if the angle θ21 is greater than the angle θ11, the liquefied fumes that fall onto the bottom surface of the second plate 120 can be removed more quickly.

Figure 9:
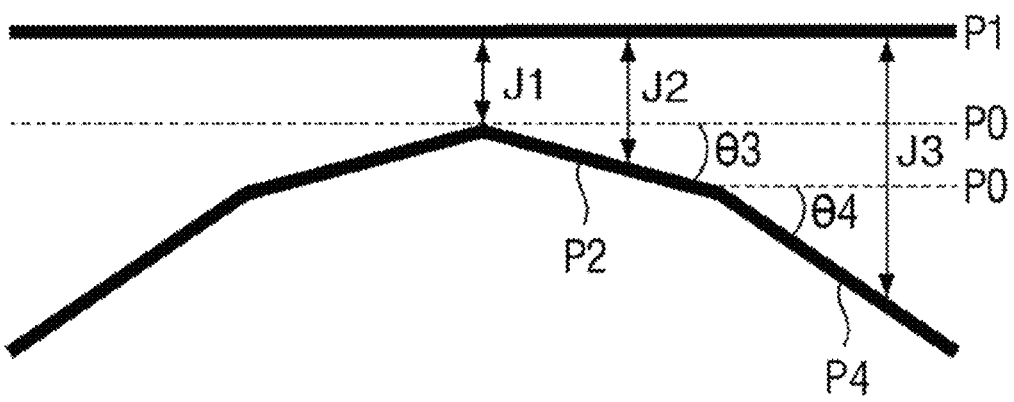
FIG. 9 is a schematic diagram illustrating a substrate processing apparatus according to some example embodiments of the inventive concepts.

FIG. 9 is a schematic drawing illustrating a substrate processing apparatus according to some example embodiments of the inventive concepts. For convenience, the embodiment of FIG. 9 will hereinafter be described, focusing mainly on the differences with the embodiment of FIGS. 3 through 7.

Referring to FIG. 9, a second plate may include a first region, a second region, which is positioned outside the first region, and a third region, which is positioned outside the second region. Here, a first distance J1 from the first region to a first plate 110 is less than a second distance J2 from the second region to the first plate 110. The second distance J2 from the second region to the first plate 110 is less than a third distance J3 from the third region to the first plate 110.

For example, an imaginary plane P2, extended along the second region, forms an angle θ3 with a horizontal plane P0, and an imaginary plane P4, extended along the third region, forms an angle θ4 with the horizontal plane P0. The angles θ3 and θ4 are both greater than 0, and the angle θ3 is smaller than the angle θ4.

Figure 10:
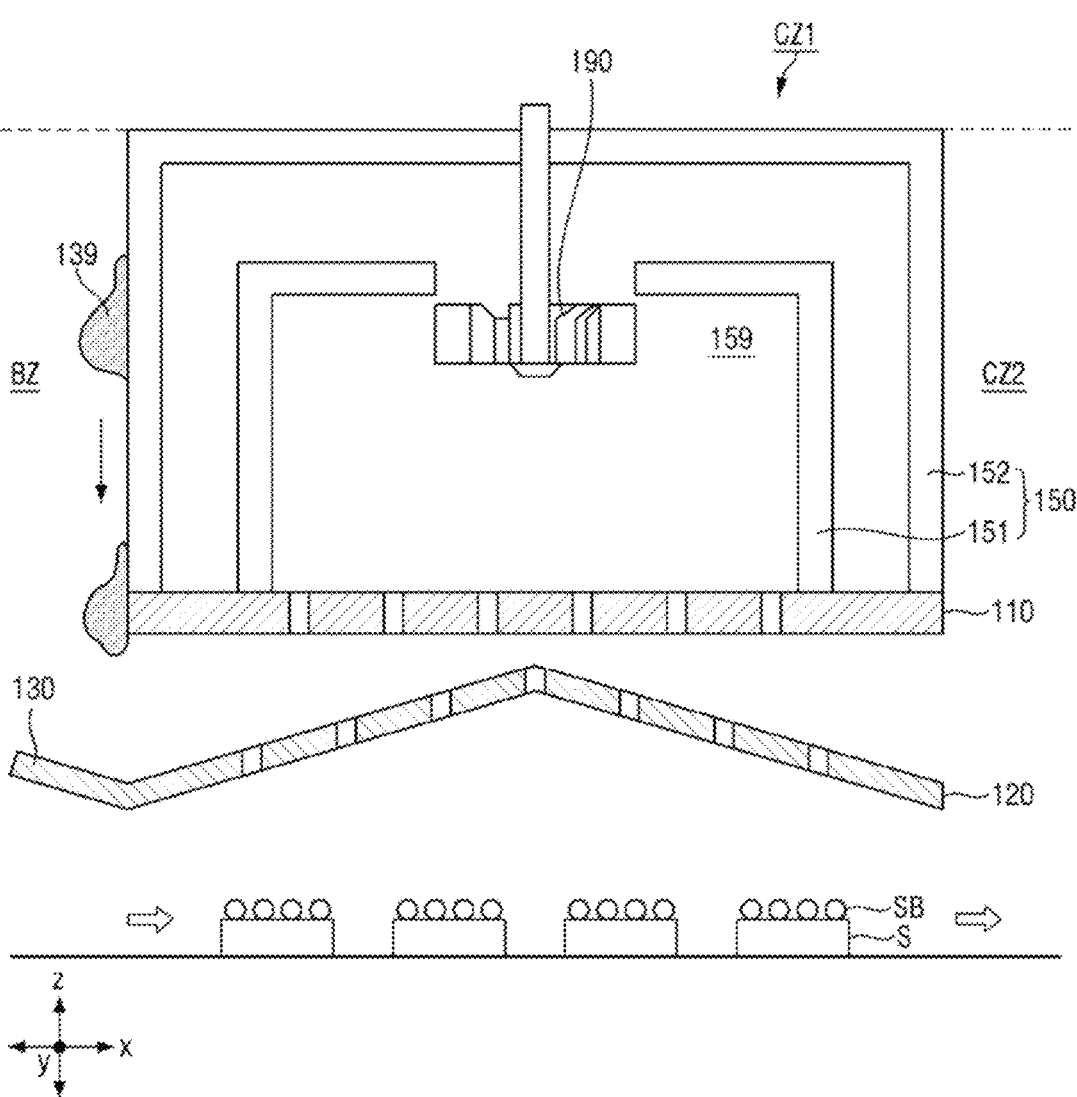
FIG. 10 is a schematic diagram illustrating a substrate processing apparatus according to some example embodiments of the inventive concepts.

FIG. 10 is a schematic drawing illustrating a substrate processing apparatus according to some example embodiments of the inventive concepts. For convenience, the embodiment of FIG. 10 will hereinafter be described, focusing mainly on the differences with the embodiment of FIGS. 3 through 7.

Referring to FIGS. 1 and 10, a heating zone HZ5, a buffer zone BZ, a cooling zone CZ1, and a cooling zone CZ2 are sequentially arranged along the x-axis direction.

The buffer zone BZ may be disposed between the heating zone HZ5 and the cooling zone CZ1. Vaporized fumes generated in the heating zone HZ5 may liquefy on the sidewalls of a frame 150 of the cooling zone CZ1 (e.g., the sidewalls of a second frame 152), after passing through the buffer zone BZ. As illustrated, the side walls of the frame 150 may be positioned in the direction in which substrates S are introduced. Liquefied fumes 139 may fall down along the frame 150.

To limit and/or prevent the liquefied fumes 139 from falling onto the substrates S, a wing 130 may be connected to and installed on the second plate 120 so as to protrude beyond the aforementioned sidewalls of the frame 150. Therefore, even if the liquefied fumes 139 fall along the frame 150, they may fall on the wing 130, rather than onto the substrates S.

Figure 11:
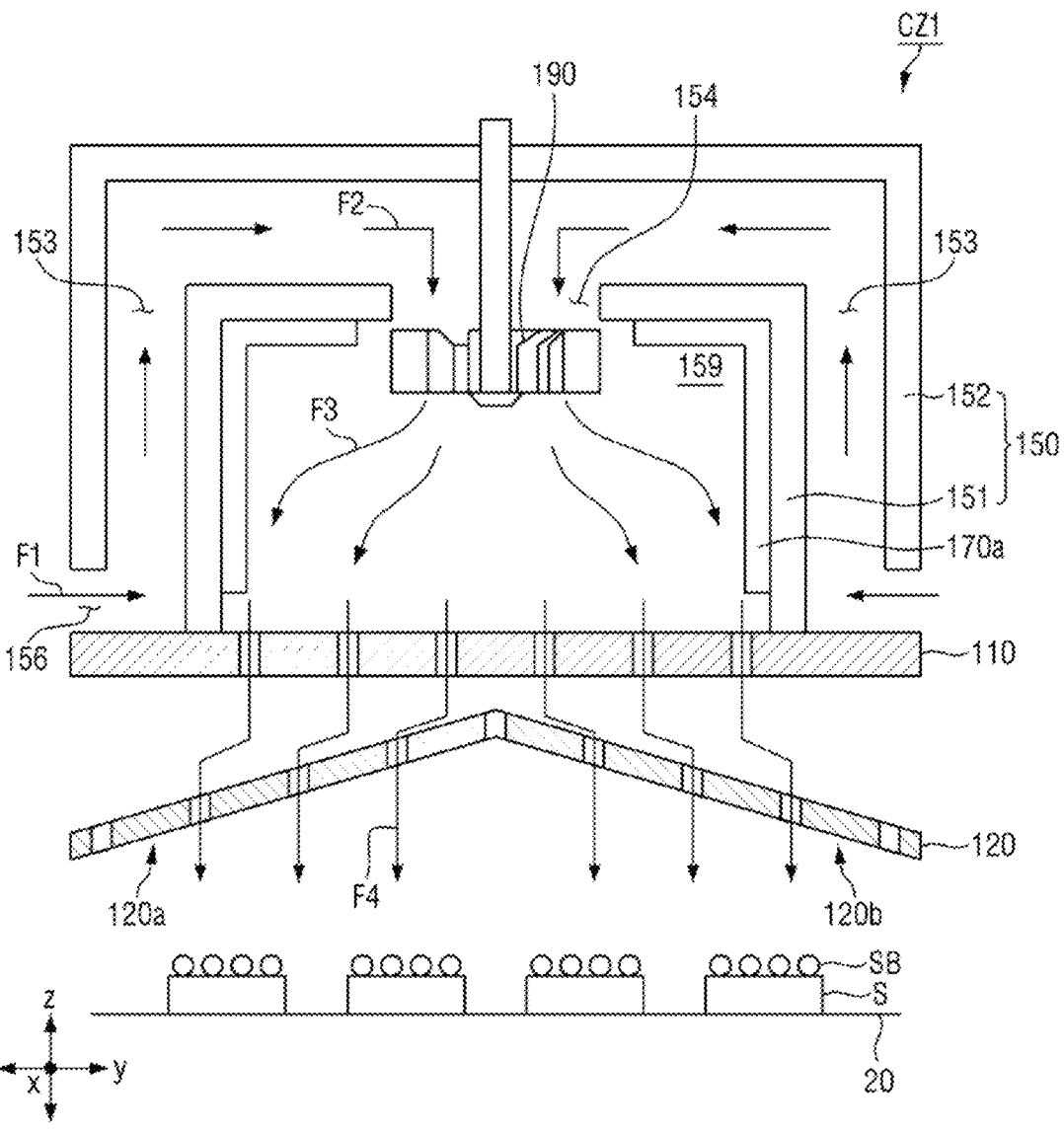
FIG. 11 is a schematic diagram illustrating a substrate processing apparatus according to some example embodiments of the inventive concepts.

FIG. 11 is a schematic drawing illustrating a substrate processing apparatus according to some example embodiments of the inventive concepts. For convenience, the embodiment of FIG. 11 will hereinafter be described, focusing mainly on the differences with the embodiment of FIGS. 3 through 7.

Referring to FIG. 11, a cooler 170*a* may be installed on the inner wall of a first frame 151, whereas the cooler 170 of FIG. 2 is disposed above the first plate 110. Alternatively, the cooler 170*a* may be installed on the outer wall of the first frame 151 or on the inner wall of a second frame 152. Thus, the gas introduced through air inlets 156 may be cooled, moving along the space between the first and second frames 151 and 152 to an air flow passage 154. Additionally, the gas may also be cooled within an internal space 159.

Figure 12:
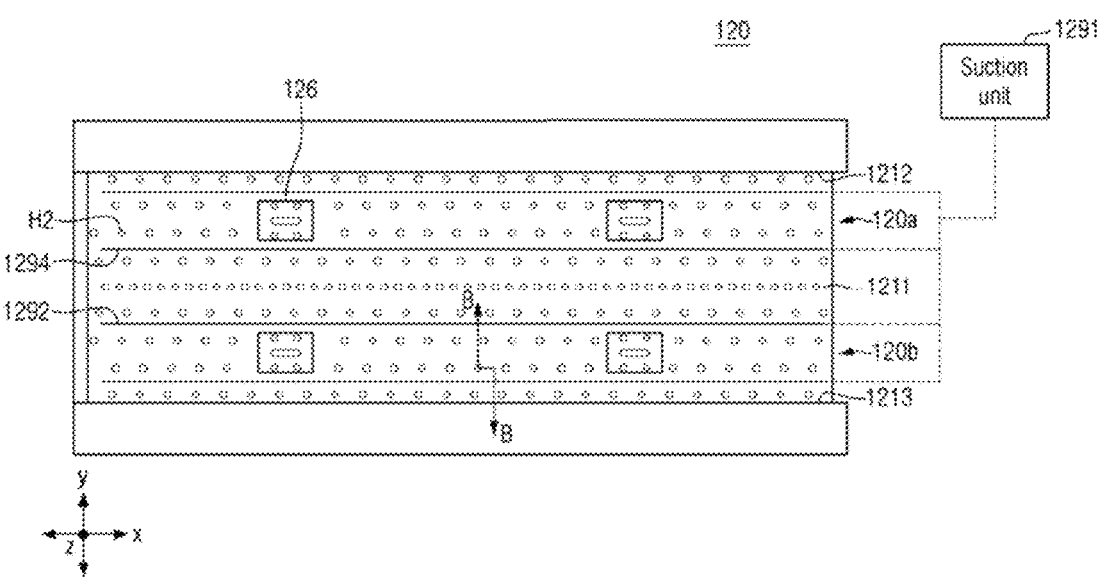
FIG. 12 is a schematic diagram illustrating a substrate processing apparatus according to some example embodiments of the inventive concepts.
Figure 13:
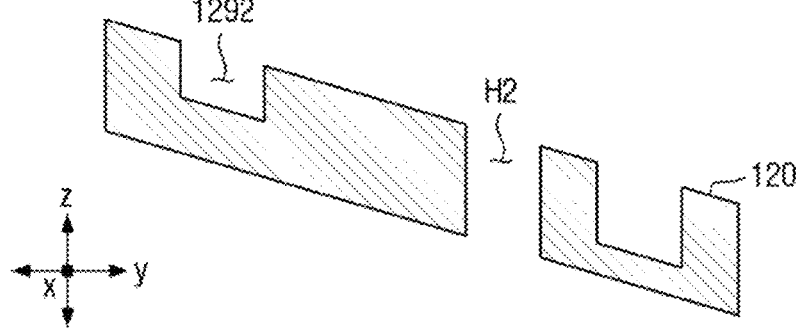
FIG. 13 is a cross-sectional view taken along line B-B of FIG. 12.

FIG. 12 is a schematic diagram illustrating a substrate processing apparatus according to some example embodiments of the inventive concepts. FIG. 13 is a cross-sectional view taken along line B-B of FIG. 12. For convenience, the embodiment of FIGS. 12 and 13 will hereinafter be described, focusing mainly on the differences with the embodiment of FIGS. 1 through 7.

Referring to FIGS. 12 and 13, one or more additional trenches (1292 and 1294) may be further formed in a second plate 120.

The trenches (1292 and 1294) may extend longitudinally in the extension direction of the second plate 120 (e.g., in the x-axis direction), but inventive concepts are not limited thereto. The trenches (1292 and 1294) may also extend longitudinally in the inclined direction of the second plate 120 (e.g., in the y-axis direction).

In a first sub-plate 120a of the second plate 120, a plurality of trenches 1294 are arranged in parallel in the y-axis direction. In a second sub-plate 120b of the second plate 120, a plurality of trenches 1292 are arranged in parallel in the y-axis direction.

A suction unit 1291 may extend in each of the trenches (1292 and 1294).

Liquefied fumes that fall onto the bottom surface of the second plate 120 flow downward along the inclined surfaces of the second plate 120 and accumulate in the trenches (1292 and 1294). The accumulated liquefied fumes in the trenches (1292 and 1294) are removed by the suction unit 1291.

Figure 14:
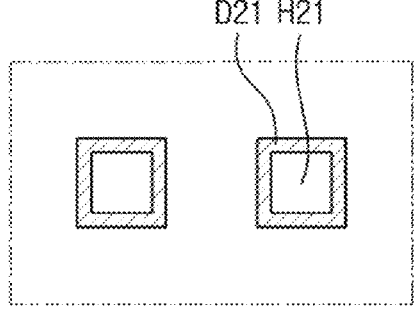
FIGS. 14, 15 and 16 are schematic diagrams illustrating substrate processing apparatuses according to some example embodiments of the inventive concepts.
Figure 15:
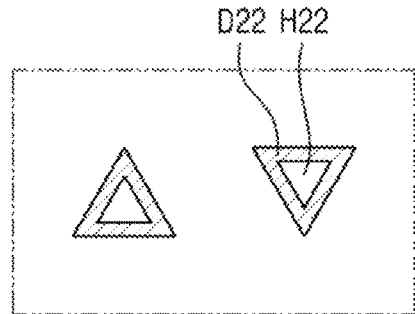
Figure 16:
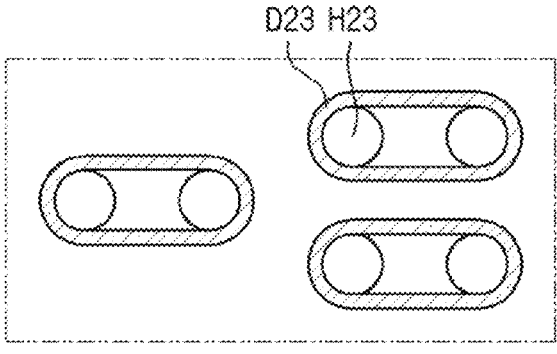

FIGS. 14 through 16 are schematic diagrams illustrating substrate processing apparatuses according to some example embodiments of the inventive concepts.

Second holes H21 and second dams D21 may have various shapes.

For example, referring to FIG. 14, the second holes H21 may be rectangular in shape. The second dams D21 may be shaped to surround the second holes H21, for example, and may have a rectangular shape.

Referring to FIG. 15, second holes H22 may be triangular in shape. Second dams D22 may be shaped to surround the second holes H22, for example, and may have a triangular shape.

Referring to FIG. 16, each of second dams D23 may be shaped to surround multiple second holes H23. Each of the second dams D23 may surround, for example, two second holes H23.

Figure 17:
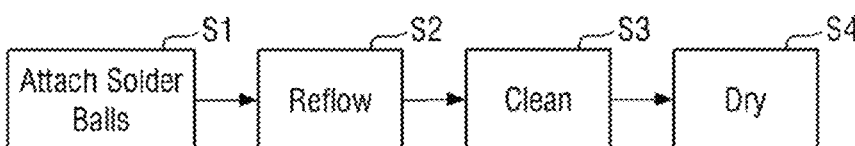
FIG. 17 is a flowchart illustrating a method of manufacturing substrates using a substrate processing apparatus according to some example embodiments of the inventive concepts.

FIG. 17 is a flowchart illustrating a method of manufacturing substrates using a substrate processing apparatus according to some example embodiments of the inventive concepts.

Referring to FIG. 17, solder balls are attached onto a substrate (S1).

For example, the substrate is loaded onto a support so that pads of the substrate face upward. Flux is applied to the pads using a dotting method. Thereafter, the solder balls are mounted on the corresponding pads.

Thereafter, a reflow process is performed on the substrate with the mounted solder balls (S2).

For example, the reflow process may be performed using the reflow device described above with reference to FIGS. 1 through 16. When the substrate with the mounted solder balls passes through the reflow device, the solder balls melt due to heat and adhere to the pads of the substrate.

A cooling zone in the reflow device includes two plates, e.g., first and second plates.

For example, the first plate includes a plurality of first holes. The second plate includes a plurality of second holes and one or more second dams surrounding at least one of the second holes and protruding toward the internal space. Here, the first holes and the second holes are staggered in a vertical direction.

A first imaginary plane extended along the first plate and a second imaginary plane extended along the second plate intersect each other at an acute angle. The first imaginary plane intersects a horizontal plane at a first angle, and the second imaginary plane intersects the horizontal plane at a second angle, which is greater than the first angle.

The second plate includes a first region and a second region positioned outside the first region. The first distance from the first region to the first plate is shorter than the second distance from the second region to the first plate.

The second plate further includes trenches configured to accumulate liquefied fumes. A suction unit is connected to the trenches to remove the accumulated liquefied fumes.

The frame includes multiple sidewalls, and the sidewalls include a first sidewall, which is disposed in the direction where the substrate is introduced. A wing may be connected to the second plate and may be installed to protrude beyond the first sidewall of the frame.

Thereafter, a cleaning process is performed on the substrate that has undergone the reflow process (S3). Residual dust, foreign materials, and flux on the substrate are cleaned using a cleaning solution (e.g., pure water).

Thereafter, a drying process is performed on the substrate that has undergone the cleaning process (S4). The drying process removes any remaining cleaning solution from the substrate.

Accordingly, example embodiments of the inventive concepts provide a substrate processing apparatus that is configured to prevent liquified fumes in a cooling zone of the substrate processing apparatus from falling on and contaminating substrates being processed in the substrate processing apparatus, and that is configured to reduce/prevent defects in the substrates to thus provide a manufacturing process that produces high quality semiconductor chips/devices.

Example embodiments of inventive concepts have been described above with reference to the accompanying drawings, but inventive concepts are not limited thereto and may be implemented in various different forms. It will be understood that inventive concepts can be implemented in other specific forms without changing the technical spirit or gist of inventive concepts. Therefore, it should be understood that the embodiments set forth herein are illustrative in all respects and not limiting.

What is claimed is:

1. A substrate processing apparatus comprising:

a frame with an opening at a bottom of the frame, the frame including an internal space;

a first plate below the frame;

and a second plate below the first plate and completely spaced apart from the first plate, wherein the first plate includes a plurality of first holes, the second plate includes a plurality of second holes, and at least one second dam surrounding at least one of the plurality of second holes and protruding toward the internal space, the second plate being downwardly inclined from a central point toward an edge, the plurality of first holes are staggered with respect to the plurality of second holes in a vertical direction, and the second plate further includes depressions configured to collect liquefied fumes.

2. The substrate processing apparatus of claim 1, wherein a first imaginary plane extended along the first plate and a second imaginary plane extended along the second plate intersect each other at an acute angle.

3. The substrate processing apparatus of claim 2, wherein the first imaginary plane intersects a horizontal plane at a first angle, the second imaginary plane intersects the horizontal plane at a second angle, and the second angle is greater than the first angle.

4. The substrate processing apparatus of claim 1, wherein the second plate has a first region, and a second region outside the first region, and a first distance from the first region to the first plate is less than a second distance from the second region to the first plate.

5. The substrate processing apparatus of claim 4, wherein the second plate further has a third region outside the second region, and the second distance from the second region to the first plate is less than a third distance from the third region to the first plate.

6. The substrate processing apparatus of claim 1, wherein the second plate has a central region, and an edge region outside the central region, the at least one second dam includes a central dam in the central region and an edge dam in the edge region, and a height of the central dam is greater than a height of the edge dam.

7. The substrate processing apparatus of claim 1, further comprising: a suction unit configured to remove the liquefied fumes collected in the depressions.

8. The substrate processing apparatus of claim 1, wherein the frame has a plurality of sidewalls, the plurality of sidewalls include a first sidewall at a location where substrates are introduced into the substrate processing apparatus, and the substrate processing apparatus further includes a wing connected to the second plate, the wing protruding beyond the first sidewall of the frame toward a direction along which the substrates are introduced.

9. The substrate processing apparatus of claim 1, wherein the first plate further includes at least one first dam surrounding at least one of the plurality of first holes, the at least one first dam protruding toward the internal space.

10. The substrate processing apparatus of claim 9, wherein the at least one first dam surrounds a single first hole from among the plurality of first holes, and the at least one second dam surrounds a single second hole from among the plurality of second holes.

11. The substrate processing apparatus of claim 1, wherein the internal space is configured to cool gas therein, and the substrate processing apparatus is configured to provide the gas cooled in the internal space onto substrates by sequentially passing through the plurality of first holes and the plurality of second holes.

12. A substrate processing apparatus comprising:

a transport unit configured to transport substrates in one direction;

a plurality of heating zones sequentially on the transport unit along the one direction; and at least one cooling zone on the transport unit along the one direction, the at least one cooling zone downstream of the plurality of heating zones, wherein the at least one cooling zone includes a frame, a first plate below the frame, and a second plate below the first plate and completely spaced apart from the first plate, the frame including an internal space and an opening at a bottom of the frame, the first plate includes a plurality of first holes and at least one first dam, the at least one first dam surrounding at least one of the plurality of first holes and protruding toward the internal space, the second plate includes a plurality of second holes and at least one second dam, the at least one second dam surrounding at least one of the plurality of second holes and protruding toward the internal space, the second plate being downwardly inclined from a central point toward an edge, the plurality of first holes are staggered with respect to the plurality of second holes in a vertical direction, and the second plate further includes depressions configured to collect liquefied fumes.

13. The substrate processing apparatus of claim 12, further comprising:

a buffer zone between the at least one cooling zone and the plurality of heating zones; and an exhaust box connected to the buffer zone, the exhaust box configured to discharge gas within the plurality of heating zones or within the at least one cooling zone.

14. The substrate processing apparatus of claim 12, wherein a first imaginary plane extended along the first plate and a second imaginary plane extended along the second plate intersect each other at an acute angle.

15. The substrate processing apparatus of claim 12, wherein the second plate has a first region, and a second region outside the first region, and a first distance from the first region to the first plate is less than a second distance from the second region to the first plate.

16. The substrate processing apparatus of claim 12, wherein solder balls are on one surface of each of the substrates, and the substrate processing apparatus is configured to perform a reflow process on the substrates as the substrates sequentially pass through the plurality of heating zones and the at least one cooling zone.

17. The substrate processing apparatus of claim 12, wherein the at least one cooling zone includes a first cooling zone and a second cooling zone, the first cooling zone is closer than the second cooling zone to the plurality of heating zones, and a number of the plurality of second holes in the first cooling zone is less than a number of the plurality of second holes in the second cooling zone.

18. A substrate processing apparatus comprising:

a frame with an opening at a bottom of the frame, the frame including an internal space;

a first plate below the frame; and a second plate below the first plate and completely spaced apart from the first plate, wherein the first plate includes a plurality of first holes, and a plurality of first dams surrounding the plurality of first holes and protruding toward the internal space, the second plate includes a plurality of second holes, and a plurality of second dams surrounding the plurality of second holes and protruding toward the internal space, the plurality of first holes are staggered with respect to the plurality of second holes in a vertical direction, the second plate has a first region, and a second region outside the first region, a first distance from the first region to the first plate is less than a second distance from the second region to the first plate, the second plate further includes depressions configured to collect liquefied fumes, and the substrate processing apparatus further includes a suction unit configured to remove the liquefied fumes collected in the depressions.

* * * * *